Aug. 28, 1962     J. B. BROWN ETAL     3,051,328
AUTOMATIC HANDLING MECHANISM
Filed March 13, 1957     7 Sheets-Sheet 1

FIG. I.

INVENTORS
JOE B. BROWN
ROBERT E. PLACE
BY Whittemore,
Hulbert & Belknap
ATTORNEYS Aug. 28, 1962 J. B. BROWN ETAL 3,051,328
AUTOMATIC HANDLING MECHANISM
Filed March 13, 1957 7 Sheets-Sheet 5

INVENTORS
JOE B. BROWN
ROBERT E. PLACE
BY
ATTORNEYS

United States Patent Office 3,051,328
Patented Aug. 28, 1962

3,051,328
AUTOMATIC HANDLING MECHANISM
Joe B. Brown, East Lansing, and Robert E. Place, Lansing, Mich., assignors to Planet Corporation, Lansing, Mich., a corporation of Michigan
Filed Mar. 13, 1957, Ser. No. 645,756
9 Claims. (Cl. 214—1)

The present invention relates to automatic handling mechanism, and more particularly to fully automatic handling mechanism adapted to pick up a work piece, manipulate it in a desired sequence and to replace it either in its original position or in a different position.

It is an object of the present invention to provide fully automatic handling mechanism comprising a work gripping device, means for transporting the work piece to a different position and for effecting universal angular adjustment of the work piece.

More specifically, it is an object of the present invention to provide a work gripping device, fully automatic means for effecting predetermined angular adjustment of the device about a first axis, fully automatic means for effecting angular adjustment of the device about a second axis perpendicular to and intersecting the first axis, fully automatic means for effecting longitudinal movement of the device along said second axis, fully automatic means for effecting angular adjustment of said device about a third axis intersecting said second axis at a point remote from the intersection between said first and second axes, and fully automatic means for effecting angular adjustment of said device about a fourth axis perpendicular to and intersecting said third axis.

Still more specifically, it is an object of the present invention to provide a table rotatable about a vertical axis, a trunnion on said table, an elongated arm assembly pivoted to said trunnion for angular adjustment about a horizontal axis intersecting said vertical axis, said arm assembly comprising a slide movable longitudinally of said arm assembly, a head assembly at one end of said slide mounted for angular adjustment about the longitudinal axis of said arm assembly, said head assembly comprising a work gripping device pivoted thereto for angular adjustment about an axis perpendicular to and intersecting the axis of angular adjustment of said head assembly, said device comprising a pair of work gripping elements relatively movable toward and away from each other.

It is a further object of the present invention to provide fully automatic handling mechanism comprising the structure defined in the preceding paragraph including fully automatic programming means for effecting sequential movement of the elements according to a predetermined program.

It is a further object of the present invention to provide apparatus as described in the foregoing in which the programming means comprises independently adjustable control elements mounted on a carriage, devices in position to be actuated by said control elements, and means for effecting timed movement of said carriage to actuate said devices in accordance with a predetermined program.

It is a further object of the present invention to provide apparatus for effecting automatic programmed movement of movable devices comprising hydraulic motor means, means for supplying hydraulic fluid to said hydraulic motor means for predetermined accurately controlled timed intervals, said control means including pressure compensating flow control valves adapted to insure accurately predetermined movement of said motor means in correspondingly accurately controlled intervals.

Other objects and features of the invention will become apparent as the description proceeds, especially when taken in conjunction with the accompanying drawings, illustrating a preferred embodiment of the invention, wherein.

Figure 1:
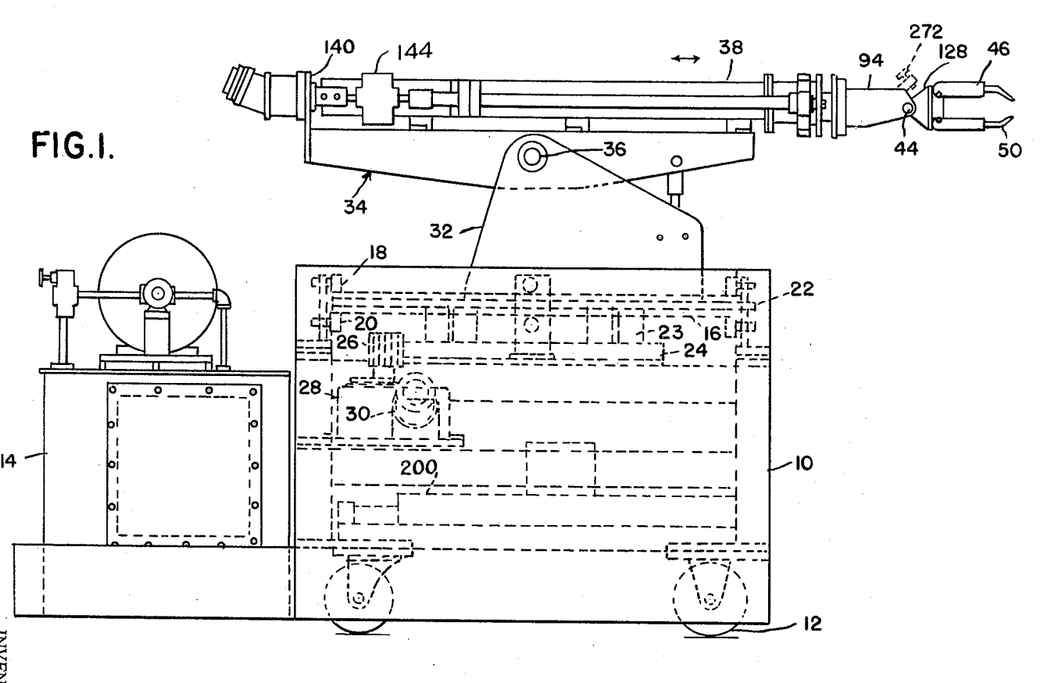
FIGURE 1 is a simplified side elevational view of the automatic handling mechanism.

In FIGURE 1 the mechanism is illustrated as comprising a main base 10 shown as mounted on wheels or casters 12 and including a hydraulic supply assembly indicated generally at 14 including a motor, reservoir and pump, details of which form no part of the present invention.

The mechanism in general comprises a table 16 the edges of which are supported between upper and lower rollers 18 and 20 and the peripheral edge of which is engaged by guide rollers 22. Connected to the table 16 by posts 23 is a drive gear 24 engaged by a drive pinion 26 driven through a speed reducer 28 from a fluid motor 30.

Extending upwardly from the table 16 is a trunnion support comprising a pair of plates 32 between which is pivoted an arm assembly 34 for movement about the axis of a horizontal pivot support 36. The arm assembly includes a slide 38 movable longitudinally thereof and carrying at one end a head and comprising a support member rotatable about the longitudinal axis of the slide, and a wrist member pivoted by pivot pins 44 to the rotary support about an axis perpendicular to and intersecting the axis of the rotary support. Suitable means, later to be described, are provided for effecting traverse of the slide 38 longitudinally thereof and providing for angular movement of the rotary support about the longitudinal axis of the slide 38. The wrist member includes work gripping structure including jaws 46. Work engaging elements 50 appropriate to the shape and condition of the work piece are secured to the jaws 46 and this structure will subsequently be described in detail.

Figures 2, 3, 4, 5:
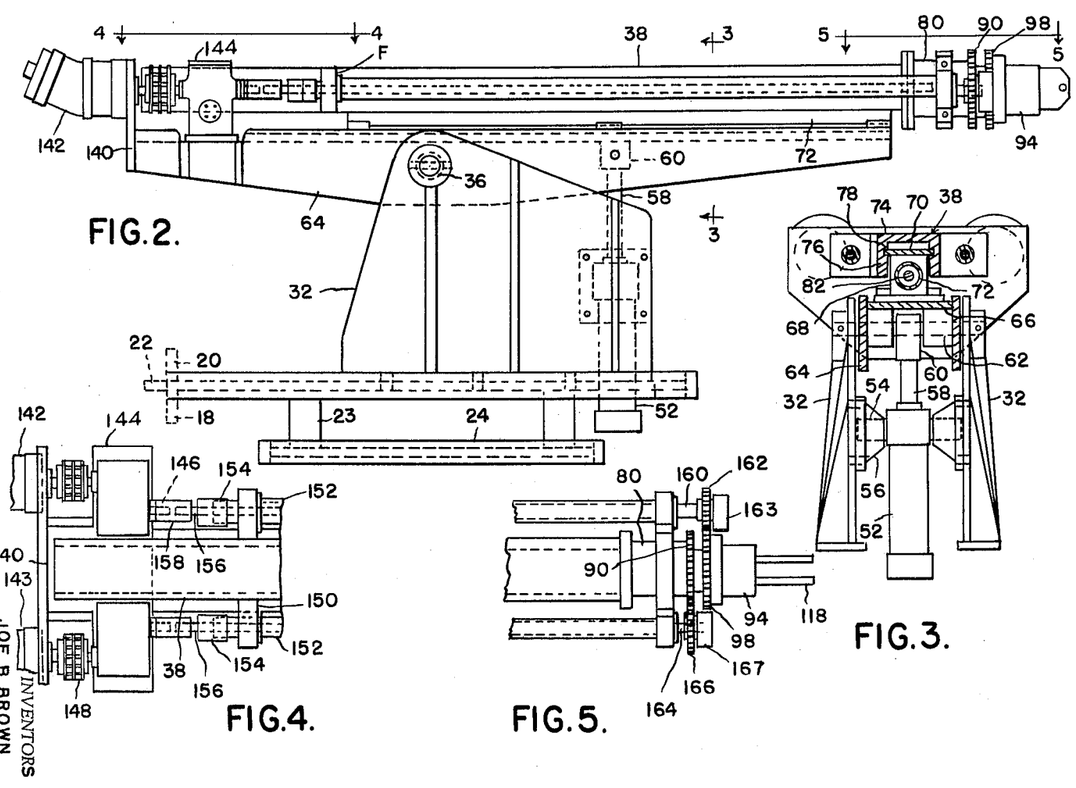
FIGURE 2 is an enlarged side elevational view of the arm assembly.
FIGURE 3 is a sectional view on the line 3—3, FIGURE 2.
FIGURE 4 is a sectional view on the line 4—4, FIGURE 2.
FIGURE 5 is a sectional view on the line 5—5, FIGURE 2.

Referring now to FIGURES 2–5 there is illustrated the mechanism for effecting angular movement of the arm assembly about the axis of the pivot support 36. This means comprises a fluid cylinder 52 having laterally extending pivot pins 54 received in pivot mountings 56 secured to the inner surfaces of the trunnion mounting plates 32. The cylinder 52 contains a piston (not shown) to which is connected a piston rod 58 having a head 60 connected by a pivot pin 62 to side plates 64 of the arm assembly 34. The side plates 64 provide the connection between the arm assembly and the pivot support or pin 36 and are interconnected by a transverse strip 66, as best seen in FIGURE 3. Extending upwardly from the strip 66 are a plurality of support members 68 which at their upper ends carry a longitudinally extending guide strip 70. The members 68 also mount a hydraulic cylinder 72.

Mounted for longitudinal movement on the bearing strip 70 is a slide 38 of inverted channel section, as seen in FIGURE 3, the opposite side walls 76 being provided with longitudinally extending recesses 78 which receive the edges of the guide strip 70. At its forward end the slide 38 has attached thereto a mounting member 80 to which the head assembly is attached. Received within the cylinder 72 is the usual piston (not shown) and connected thereto is a piston rod 82 the forward end of which is connected to the mounting member 80. Accordingly, as hydraulic fluid is admitted to the interior of the cylinder to the left of the piston as seen in FIGURE 2, the piston is moved to the right and carries the slide 38 and associated mechanism therewith.

Figures 6, 7, 8:
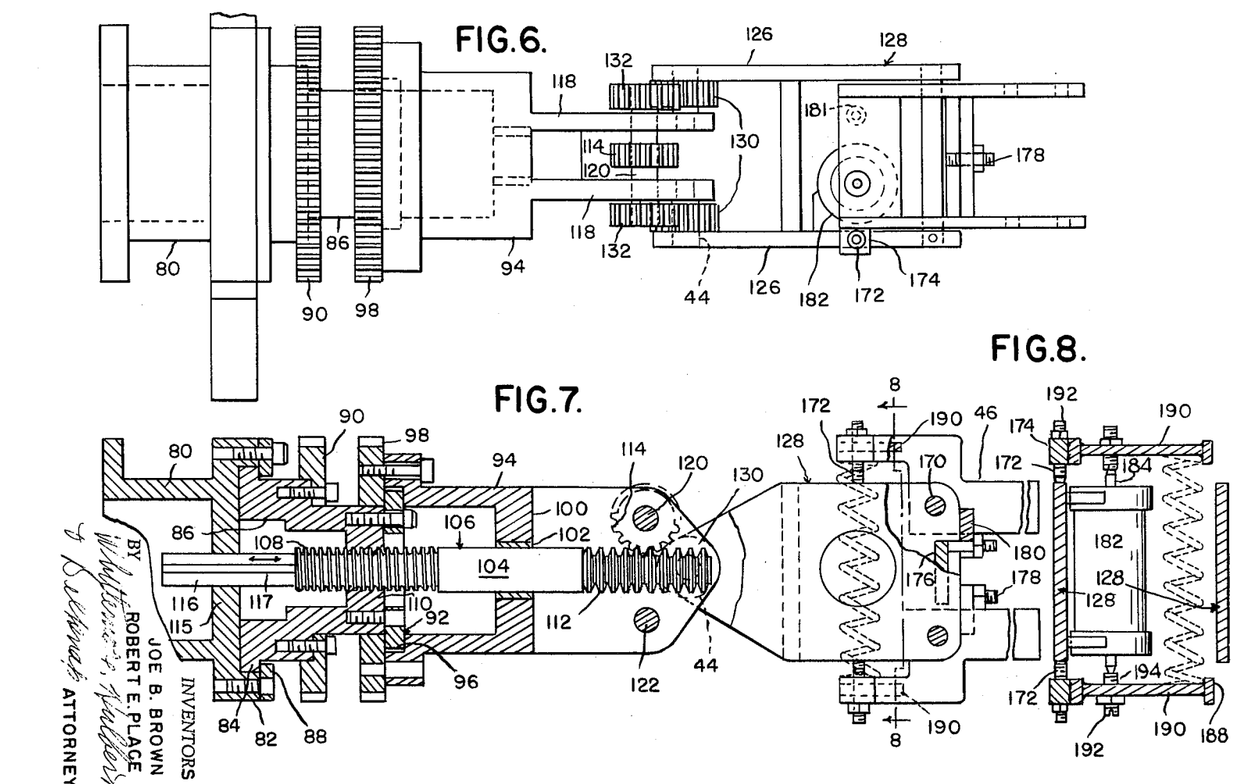
FIGURE 6 is an enlarged fragmentary plan view of the head assembly.
FIGURE 7 is a longitudinal sectional view through the head assembly.
FIGURE 8 is an incomplete sectional view on the line 8—8, FIGURE 7.

Adverting briefly to FIGURES 6–8, the head assembly of the apparatus is disclosed. The mounting member 80 is provided with a forwardly extending circular flange 82 which receives a radially outwardly extending flange 84 of a rotatable member 86. An annular member 88 is bolted or otherwise secured to the flange 82 and supports the member 86 on the mounting member 80 for free rotation. Bolted or otherwise secured to the member 86 is a gear 90. At its forward end the member 86 has bolted or otherwise secured thereto an annular member 92 the outer portion of which extends radially beyond the forward end of the member 86 and serves as a rotary support for a member 94. The member 94 at its rear end has an annular channel 96 which receives the outer peripheral portion of the annular member 92. Bolted or otherwise secured to the inner end of the member 94 is a second gear 98. The member 94 is provided with a transverse web 100 which receives a bearing 102 in which is received a cylindrical portion 104 of a wrist actuator 106. The wrist actuator 106 includes a threaded portion 108 and the member 86 is provided with a transverse web 110 having a threaded opening therethrough for receiving the threaded portion 108 of the wrist actuator 106. At its forward end the wrist actuator is provided with a series of circular rack teeth 112. These teeth are adapted to mesh in the manner of a rack with a pinion 114 in any position of rotation of the member 94 about the axis of the wrist actuator. Mounting member 80 is provided with a transverse web 115 having a non-circular opening therethrough which receives the inner end portion 116 of the wrist actuator 106. The end portion 116 of the wrist actuator is non-circular and engages in the non-circular opening in the web 115. Conveniently, the non-circular shapes referred to may involve a key 117 on the wrist actuator and a correspondingly shaped recess in the opening in the web 115.

The member 94 at its outer end is provided with a pair of laterally spaced flanges 118 having openings for receiving pivot pins 120, 122, and 44. Connected to the pivot pins 44 are inwardly extending flanges 126 of a wrist member 128. The wrist member 128 has fixedly secured thereto a pair of gears 130 which mesh with gears 132 and 134 which are fixedly secured to the pivot pins or shafts 120 and 122. In addition, the shaft 120 has the gear or pinion 114 fixedly secured thereto.

Means later to be described are provided for effecting rotation of the gear 90 which in turn results in axial advance of the wrist actuator 106 since it is prevented from turning about the action of its key 117 and hence is advanced by the operation of its threaded portion 108 in the threaded opening in the web 110.

Axial advance of the wrist actuator 106 effects positive rotation of the pinion 114 in mesh therewith and this in turn effects positive rotation of the pinions 132 and hence the pinions or gears 130 which are fixed to the wrist member 128. Accordingly, axial advance of the wrist actuator 106 results in rocking of the wrist member 128 about the axes of pins 44. The lower gears or pinions 134 are also in mesh with the fixed gears or pinions 130 and serve to stabilize the wrist motion of the wrist member 128.

Referring again to FIGURES 2–5, the mechanism for effecting rotation of the gears 90 and 98 will now be described. Mounted on a flange 140 at the rear end of the stationary portion of the arm are a pair of hydraulic motors 142 and 143. As best seen in FIGURE 4, these hydraulic motors are offset with respect to the centerline of transmission shafts connected thereto and are connected to these shafts through speed reducers 144 having output shafts 146. The input shafts of the speed reducers are connected to the hydraulic motors 142 and 143 through flexible couplings 148. Connected to the slide 38 by brackets 150 are rotatable torque transmitting tubes 152 having sleeves 154 which are provided with square openings adapted to receive square drive rods 156 coupled to the output shafts of the speed reducers by coupling sleeves 158. At their forward ends the tubes 152 are fixedly secured to drive shafts, one of these shafts being designated 160 and carrying a pinion 162 meshing with the gear 98. The gear 162 is connected to the shaft 160 by means of a slip clutch 163. The other torque transmitting drive tube has a relatively shorter driving extension 164 to which is secured a pinion 166 in meshing relation with the gear 90. The pinion 166 is secured to the shaft or extension 164 by means of a slip clutch 167.

One of the functions of the speed reducers 144 is to positively prevent rotation of the gear 162 or 166 associated therewith except as a result of torque transmitted thereto through the speed reducer. In other words, the speed reducer prevents reaction back to either of the hydraulic motors 142 or 143 which is not being operated. Instead of a speed reducer, suitable brake means such for example as a solenoid actuated brake or the like, could be employed.

Referring again to FIGURES 6–8 the wrist member 128 has associated therewith a pair of pivoted jaws 46 previously referred to. The jaws 46 are pivoted to flanges 126 of the wrist member 128 by pivot pins 170 and carry adjustable abutment screws 172 extending through threaded openings in lugs 174 and engageable with the upper and lower edges of the flanges 126. Also extending between the flanges 126 is an abutment strip 176 engageable by adjustable abutment screws 178 carried by vertically extending lugs 180 on the jaws 46. Thus, the jaws are provided with rigid but adjustable abutments which limit their opening and closing movement.

Suitable means such for example as a tension spring 181 acting between the inner ends of the jaws tend to urge the jaws toward opening position. In order to close the jaws against the force of the spring a hydraulic cylinder 182 is provided having two pistons therein each terminating in an outwardly extending pointed piston rod 184. Extending between side plates 188 of the jaws 46 are strips 190 carrying adjustable recessed screws 192, the recesses as indicated at 194 being shaped to receive the pointed outer ends of the piston rods 184.

From the foregoing description it will be apparent that the work engaging jaws 46 may be swung about the vertical axis of the table 16 by appropriate controlled energization of the hydraulic motor 30. In like manner, the work engaging jaws may be swung in a vertical plane about the axis of the pivot support 36 by controlled supply of hydraulic fluid to the cylinder 52. Also, rectilinear traverse of the jaws along the axis of the arm assembly 34 may be accomplished by controlled admission of hydraulic fluid to the cylinder 72. Similarly, angular adjustment of the jaws as a unit about the longitudinal axis of the arm assembly 34 is accomplished by energization of the motor 142 which drives the gear 98 and hence the rotary support member 94. Rocking of the wrist member 128 about the axis of pins 44 is accomplished by energization of the motor 143 which rotates the gear 90 and hence effects axial advance of the wrist actuator 106.

It will thus be observed that the jaws may be actuated to grip a work piece and may be swung to any position within reach of the mechanism to move the work piece to the required position and to turn it into substantially angular position within the range of movement of the machine. Thus for example, a container may be picked up at a designated position and swung about the vertical axis of the mechanism to a different position of radial adjustment, advanced rectilinearly along the axis of the arm radially of the machine to a require position, swung in a vertical plane to the required height, maintained with its side upwardly by appropriate manipulation of the wrist member, and when desired, inverted to spill the contents. This is simply illustrative of one of the many sequences of movement. Moreover, the several movements may be timed to take place simultaneously or consecutively as required without interference from one to the other.

In general, it will be observed that every motion of the machine is accomplished by means of a hydraulic motor. These motors are different in form and include simple pistons and cylinders for effecting some of the motions, and including rotary hydraulic motors such as those illustrated at 142 and 143. It is a property of the hydraulic motors selected for use in the present mechanism that the actual movement thereof is controlled by the quantity of hydraulic fluid admitted thereto. In other words, the hydraulic motors are all of the positive displacement type.

This fact permits simplification of design in the present instance by employing control means for the hydraulic motors in the form of pressure compensated flow control valves. These in turn are associated with accurately controlled timing means which maintain the several valves open for a predetermined interval. Inasmuch as the flow of hydraulic fluid is pressure compensated, a definite quantity of hydraulic fluid flows through an open valve in a predetermined interval and will result in a correspondingly predetermined definite movement of the portion of the mechanism moved thereby. Thus for example, the admission of fluid to the hydraulic cylinder 72 for a definite number of timed units will always result in a definite linear advance of the slide 38.

In order to insure positive programming and movement of the several parts of the mechanism to predetermined positions irrespective of the number of times the program is repeated, the mechanism is so designed that upon completion of each sequence, the movable elements are all moved to an initial position against positive stops. Thus, each program of several movements is initiated from the same identical position. This in turn prevents the accumulation of small errors in positioning which might otherwise occur.

The mechanism for effecting a predetermined programming of the movable parts is illustrated in FIGURES 9–13.

Figure 9:
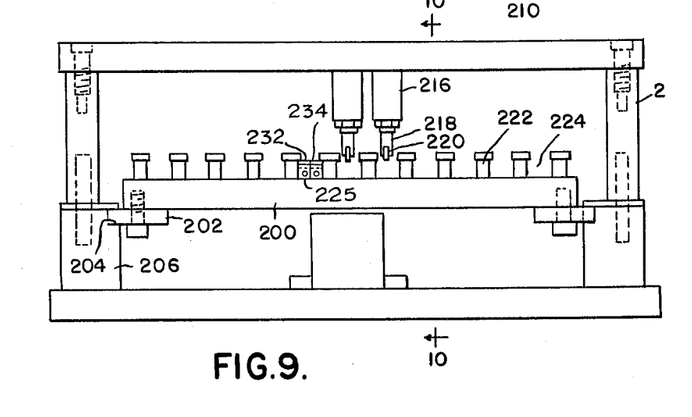
FIGURE 9 is an elevational view on the control plate assembly with the end strips removed therefrom and illustrating representative racks, cams and switch mechanisms.
Figure 10:
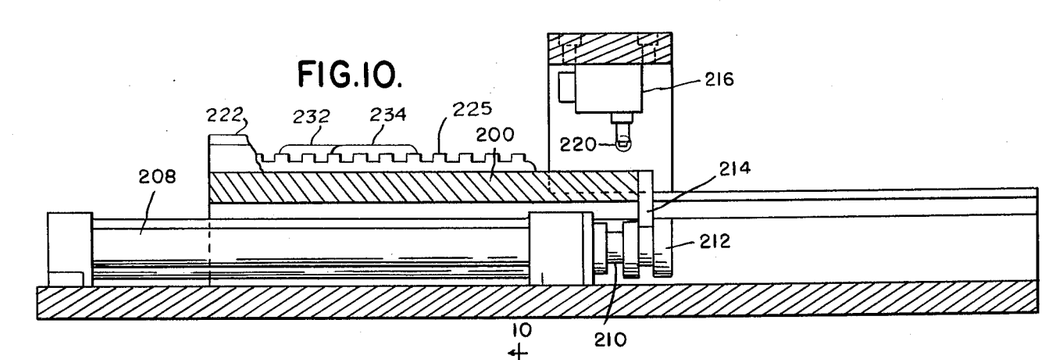
FIGURE 10 is a sectional view on the line 10—10, FIGURE 9.

Located within the base of the machine is a control plate 200 having support strips 202 received in grooves 204 in frame support elements 206. A hydraulic cylinder 208 is provided having a piston therein connected to a piston rod 210 having a spool construction 212 at its outer end receiving a depending yoke 214 on the plate 200. The cylinder 208 has fluid admitted thereto at a carefully controlled value and constitutes means for moving the control plate 200 at an accurately controlled velocity. The timed controlled movement of the plate 200 determines the control of the positions reached by movable members of the apparatus in a programmed cycle.

Figure 11:
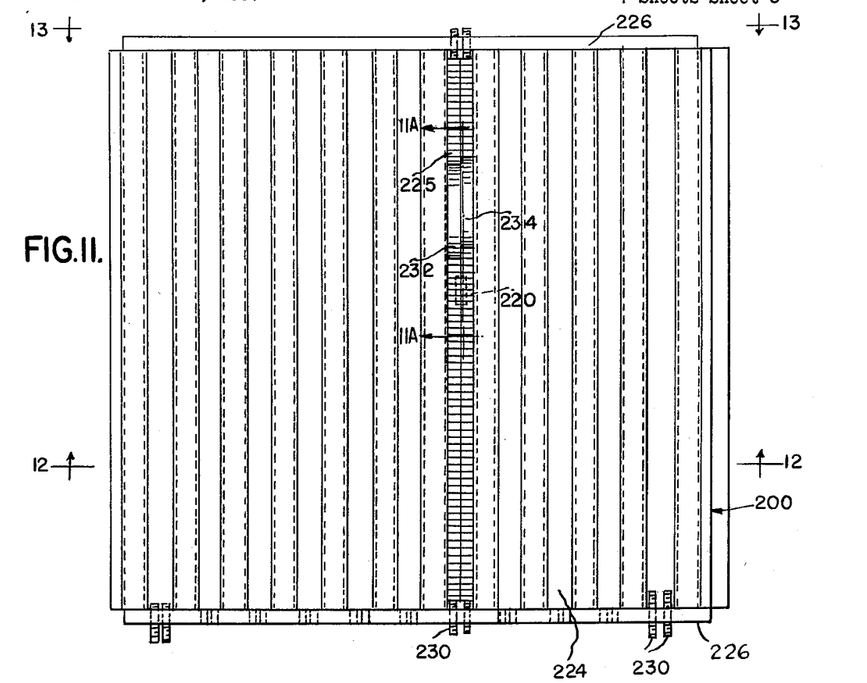
FIGURE 11 is a plan view of the control plate.

Disposed above the control plate 200 are a plurality of limit switches 216 each of which is provided with a downwardly extending vertical movable plunger 218 terminating in a roller 220. Disposed on the control plate are a plurality of strips 222 defining channels 224 therebetween. A channel 224 is associated in centralized aligned relation with each of the rollers 220. Disposed within the channels 224 are a pair of rack members 225 positioned with the toothed side uppermost and extending into the vicinity of end strips 226. The end strips 226 are provided with a plurality of pairs of tapped openings 228 therein located adjacent each end of each of the channels 224 and these openings receive screws 230. Thus, each of the rack sections 225 may be adjusted independently of the other longitudinally of its channel by appropriate adjustment of the screws 230.

The racks are intended for receiving correspondingly toothed elongated solenoid actuating cams, a pair of cams 232 and 234 being illustrated in FIGURE 11. It will be observed that each of the cam members 232 or 234 may be positioned anywhere along the extent of the associated rack 225, the limit of accuracy in positioning the cam being determined by the pitch of the rack teeth. However, absolute accuracy in positioning the cams may be obtained since longitudinal adjustment of the rack teeth is at least as great as the pitch of the teeth.

Figures 11A, 13:
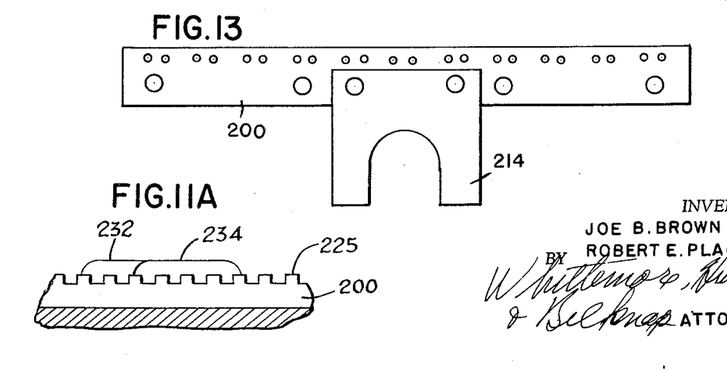
FIGURE 11A is a fragmentary side elevational view on the line 11A—11A, FIGURE 11.
FIGURE 13 is a profile view looking in the direction of the arrows 13—13, FIGURE 11.
Figure 12:
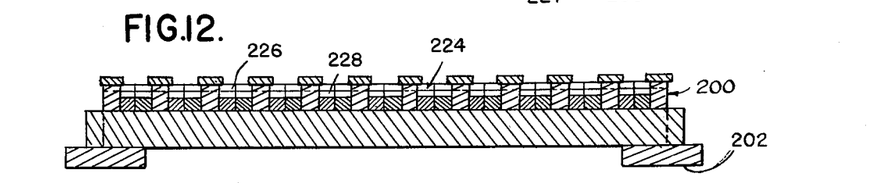
FIGURE 12 is a sectional view on the line 12—12, FIGURE 11.

It will be observed in FIGURE 9 that each of the solenoid actuating rollers 220 is in position to overlie the lateral junction between adjacent cam elements. In FIGURES 11 and 11A the cam elements 232 and 234 are shown as out of lateral alignment. Thus, upon movement of the control plate 200 downwardly as seen in FIGURE 11, the roller whose position is indicated in the FIGURE, is first actuated by engagement with the cam 232. It will be maintained in elevated position for a period dependent upon the length of the cam rise. However, when the cam 232 has passed the roller 220 it will still be maintained in elevated position until the trailing edge of the cam 234 has passed the roller 220. From the foregoing it will be seen that the construction provides for great flexibility in control of a timed interval of supply of fluid to a positive hydraulic motor. Movement of both cams 232 and 234 will shift the timing of the supply of fuel by the valve controlled thereby without change in the interval during which fluid is supplied. On the other hand, adjustment of the cam 232 or 234 independently of the other may be used to delay or advance initiation or termination of fluid supply with corresponding increase or decrease in the interval during which fluid is supplied. As previously outlined, a change in the time interval during which fluid is supplied results in a direct and corresponding change in the amount of movement imparted to the part of the apparatus under control of the valve actuated by the solenoid.

Figure 14:
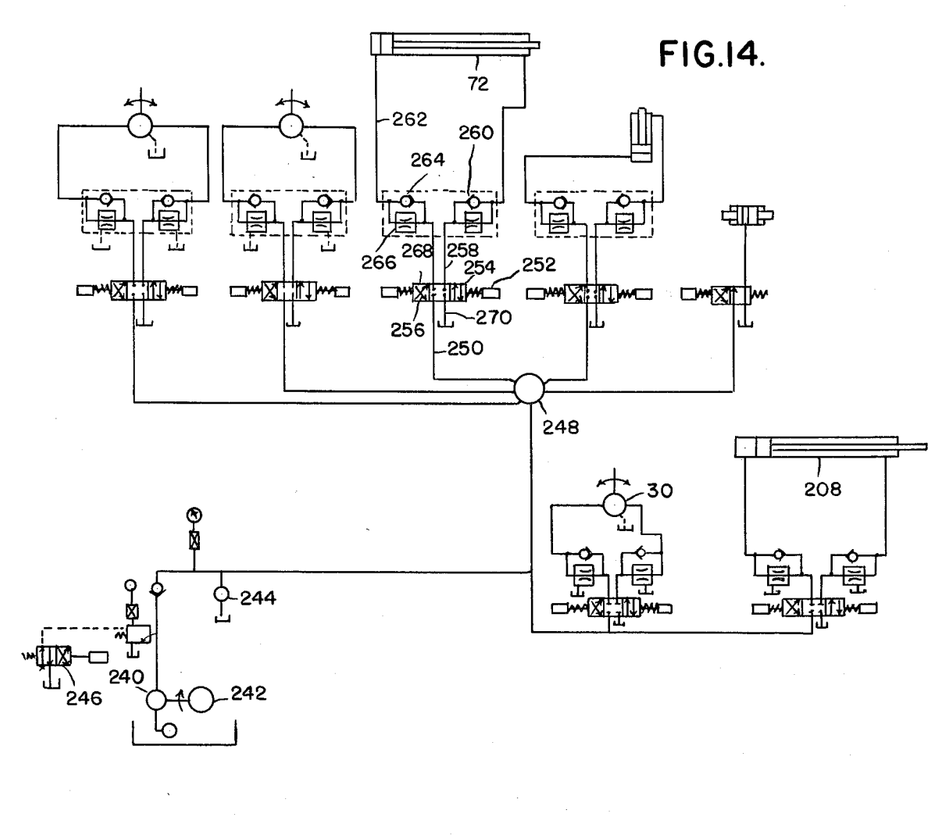
FIGURE 14 is a simplified hydraulic diagram of the apparatus.
Figure 15:
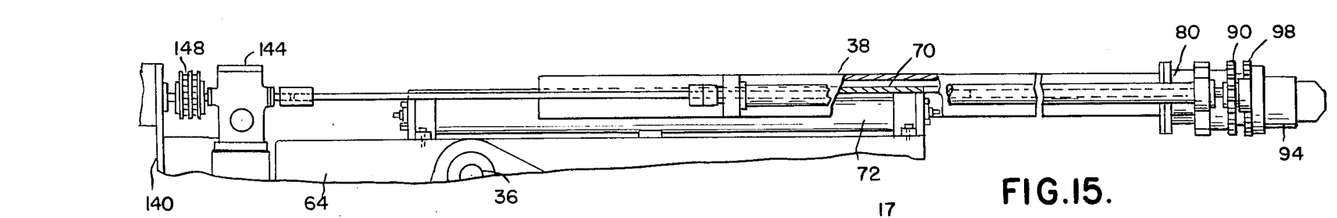
FIGURE 15 is a partial enlarged side elevation view of the arm assembly similar to the arm assembly shown in FIGURE 2 with the slide in extended position and partially broken away to show the guide strip therefor.
Figure 16:
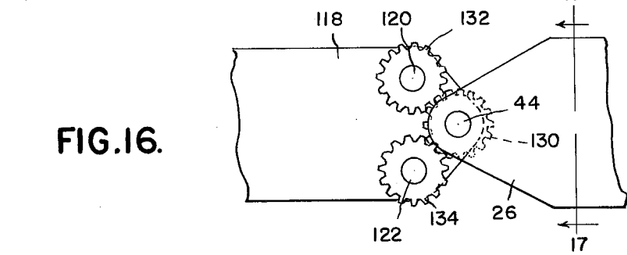
FIGURE 16 is an elevation view of a portion of the head assembly shown in FIGURE 7 illustrating the relative position of the gears for pivoting the wrist member.
Figure 17:
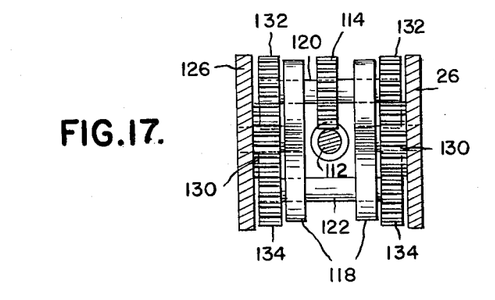
FIGURE 17 is a section view on the line 17—17 in FIGURE 16 illustrating the relative position of the gears for pivoting the wrist member.

Referring now to FIGURE 14 there is illustrated a simplified hydraulic circuit of the apparatus. The source of hydraulic fluid under pressure is indicated as a pump 240 driven by a motor 242. Pressure of fluid supplied to the system is controlled by a pressure switch 244 which is adapted to dump fluid through the solenoid controlled valve 246 when pressure exceeds the required value. Pressure is applied to the control plate drive as indicated on the drawing. When one of the solenoids is energized fluid is supplied to the appropriate end of the control plate cylinder 208 to advance the control plate in a timing stroke. Advance movement of the control plate effects the proper sequential controlled energization of the several solenoids designated on the drawing to open a pressure compensating flow control valve such as a Vickers Corporation valve FCG–02–075 to the appropriate part of the mechanism for a predetermined interval. Inasmuch as the arm and associated mechanism is rotatable about a vertical axis by energization of the motor 30, it is necessary to supply fluid for inter-jaw rotation, jaw tilting or wrist action, rectilinear traverse, vertical swinging movement of the arm, and clamping of the jaws through a multiple port revolving manifold indicated diagrammatically at 248.

While the diagram is believed self-explanatory, the mechanism for effecting a controlled movement of the slide 38 will be described. Fluid is admitted through the manifold 248 to the fluid line 250. If the solenoid designated 252 is energized, drawing the valve plunger 254 to the right, fluid under pressure passes through the valve passage 256 to the fluid line 258 and thence through the check valve 260 to the right hand end of the cylinder 72. This will result in movement of the slide 38 to the left as seen in FIGURE 2. Fluid to the left of the piston within the cylinder 72 is expelled through the hydraulic line 262. Pressure within this line closes the check valve 264 and flow of fluid out of the cylinder is thus metered through the pressure compensating flow control valve diagrammatically indicated at 266. This return flow passes through the valve passage 268 to the discharge line 270 where it returns to a sump.

The action of the additional motions is readily apparent from the foregoing.

It will be appreciated that the positive stops referred to which provide for initiation of each movement of each control cycle from a definitely predetermined position may be adjustable and constitute simple adjustable stops such as indicated in dotted lines 272 in FIGURE 1 for controlling position of the wrist member 128. Similar means, such for example as an adjustable abutment carried at the periphery of the table 16 and engageable with the appropriate one of the edge engaging rollers 22 may be provided. These means stall the associated mechanism at the preset or cycle start point. Inasmuch as the actuating devices in all cases are hydraulic motors, this is permitted without damage to the mechanism and provides that any small error which may exist in moving one of the movable parts to a required position will not be cumulative.

The drawings and the foregoing specification constitute a description of the improved automatic handling mechanism in such full, clear, concise and exact terms as to enable any person skilled in the art to practice the invention, the scope of which is indicated by the appended claims.

What we claim as our invention is:

1. Article handling mechanism comprising an adjustable arm, a slide carried by said arm extending parallel to and movable longitudinally of the arm, a head at one end of said slide comprising a rotary support member connected to said slide for angular adjustment about the longitudinal axis of said arm and a wrist member pivotally connected to said rotary support member for angular adjustment about an axis perpendicular to the longitudinal axis of said arm, a pair of rotary drive motors at the end of said arm opposite said head, first actuating means for angularly adjusting said support member, means for pivoting said wrist member comprising a rotary gear on said rotary support member, a rotary circular rack having a threaded portion, a nut engaging the threaded portion, means supporting the nut for rotation and against axial movement, means supporting said rack against rotation, and means for rotating said nut to advance said rack to rotate said gear, and transmission means coupling said motors to said actuating means and gear respectively.

2. Article handling mechanism comprising a frame, a support positioned on said frame for angular movement about a vertical axis, means for angularly moving said support with respect to said frame, an elongated arm mounted on said support for angular movement about a first horizontal axis, means for angularly moving said arm about said first horizontal axis, a slide carried by said arm capable of longitudinal movement with respect thereto, cylinder and piston means for producing relative longitudinal movement between said arm and slide, a head secured to one end of said slide comprising a first portion capable of rotation about the longitudinal axis of said slide, and a second portion attached to said first portion capable of pivotal movement about an axis perpendicular to the axis of said slide, means for producing rotation of said first portion, means for producing pivotal movement of said second portion including a rotary gear attached to said second portion coaxial with the pivot axis of said second portion, a rotary circular rack in engagement with said gear and having a threaded portion, a nut engaging the threaded portion, means supporting the nut for rotation and against axial movement, means supporting said rack against rotation, and means for rotating said nut to advance said rack to rotate said gear, finger members secured to said second portion for relative movement toward and away from each other, and motor means for producing said relative movement.

3. Article handling mechanism comprisng a frame, a support positioned on said frame for angular movement about a vertical axis, means for angularly moving said support with respect to said support, an elongated arm mounted on said frame for angular movement about a first horizontal axis, means for angularly moving said arm about said first horizontal axis, a slide carried by said arm capable of longitudinal movement with respect thereto, cylinder and piston means for producing relative longitudinal movement between said arm and slide, telescoping drive shafts connected to said slide and arm in parallel relation therewith and automatically adjustable in length on relative longitudinal movement between said slide and arm, a head secured to one end of said slide comprising a first portion capable of rotation about the longitudinal axis of said slide, and a second portion attached to said first portion capable of pivotal movement about an axis perpendicular to the axis of said slide, means for producing rotation of said first portion including a rotary drive motor secured to said arm, a gear secured to and coaxial with said first portion and a pinion in mesh with said gear and driven by said motor through telescoping drive means, means for producing pivotal movement of said second portion including a rotary gear attached to said second portion coaxial with the pivot axis of said second portion, a rotary circular rack in engagement with said gear and having a threaded portion, a nut engaging the threaded portion, means supporting the nut for rotation and against axial movement, means supporting said rack against rotation, means for rotating said nut to advance said rack to rotate said gear, finger members secured to said second portion for relative movement toward and away from each other, motor means for producing said relative movement, and control means operable to sequence said movements including a pressure compensated flow control valve and timing means therefor for opening said valve for a predetermined interval.

4. Article handling mechanism comprising a frame, a support positioned on said frame for angular movement about a vertical axis, means for angularly moving said support with respect to said frame, an elongated arm mounted on said support for angular movement about a first horizontal axis, means for angularly moving said arm about said first horizontal axis, a slide carried by said arm capable of longitudinal movement with respect thereto, cylinder and piston means for producing relative longitudinal movement between said arm and slide, a head secured to one end of said slide comprising a first portion capable of rotation about the longitudinal axis of said slide, and a second portion attached to said first portion capable of pivotal movement about an axis perpendicular to the axis of said slide, means for producing rotation of said first portion, means for producing pivotal movement of said second portion including a first rotary gear attached to said second portion coaxial with the pivot axis of said second portion, a pair of rotary gears secured to said first portion for rotation together one of which is in engagement with said first rotary gear, a rotary circular rack in engagement with the other of said pair of gears and having a threaded portion, a nut engaging the threaded portion, means supporting the nut for rotation and against axial movement, means supporting said rack against rotation, and means for rotating said nut to advance said rack to rotate said gear through said pair of gears, finger members secured to said second portion for relative movement toward and away from each other, motor means for producing said relative movement, and means associated with each of the means producing movement to control said movements in time and extent.

5. Article handling mechanism comprising a frame, a support positioned on said frame for angular movement about a vertical axis, means for angularly moving said support with respect to said frame, an elongated arm mounted on said support for angular movement about a first horizontal axis, means for angularly moving said arm about said first horizontal axis, a slide carried by said arm capable of longitudinal movement with respect thereto, cylinder and piston means for producing relative longitudinal movement between said arm and slide, a head secured to one end of said slide comprising a first portion capable of rotation about the longitudinal axis of said slide, and a second portion attached to said first portion capable of pivotal movement about an axis perpendicular to the axis of said slide, means for producing rotation of said first portion, means for producing pivotal movement of said second portion including a first rotary gear attached to said second portion coaxial with the pivot axis of said second portion, a pair of rotary gears secured to said first portion for rotation together one of which is in engagement with said first rotary gear, a rotary circular rack in engagement with the other of said pair of gears and having a threaded portion, a nut engaging the threaded portion, means supporting the nut for rotation and against axial movement, means supporting said rack against rotation, and means for rotating said nut to advance said rack to rotate said gear through said pair of gears, finger members secured to said second portion for relative movement toward and away from each other, motor means for producing said relative movement, and means associated with each of the means producing movement to control said movements in time and extent, including separate pressure compensated flow control valves and timing means for opening said valves for predetermined intervals.

6. Article handling apparatus comprising a first support, a nut mounted on said support for rotation only with respect thereto, a rotary support mounted on said nut for rotation only about the axis of said nut, a wrist member pivoted to said rotary support for angular movement about an axis perpendicular to the axis of said nut, gearing for actuating said wrist member including a first gear fixed to said wrist member concentric with its pivot axis, said gearing also including a second gear rotatably supported on said rotary support in mesh with said first gear, a third gear coaxial with respect to and rigidly secured to said second gear for rotation therewith, a circular rack in mesh with said third gear having a threaded portion engaged in said nut and key means to prevent turning of said rack relative to said first support, drive gears fixedly secured to said nut and to said rotary support, pinions carried by said first support in mesh with said drive gears, drive means connected to said pinions for selectively rotating said pinions, and means for handling articles secured to said wrist member.

7. Article handling apparatus comprising a first support, a nut mounted on said support for rotation only with respect thereto, a rotary support mounted on said nut for rotation only about the axis of said nut, a writ member pivoted to said rotary support for angular movement about an axis perpendicular to the axis of said nut, gearing for actuating said wrist member including a first gear fixed to said wrist member concentric with its pivot axis, said gearing also including a second gear rotatably supported on said rotary support in mesh with said first gear, a third gear coaxial with respect to and rigidly secured to said second gear for rotation therewith, a circular rack in mesh with said third gear having a threaded portion engaged in said nut and key means to prevent turning of said rack relative to said first support, drive gears fixedly secured to said nut and to said rotary support, pinions carried by said first support in mesh with said drive gears, drive means connected to said pinions for selectively rotating said pinions, said drive means each including irreversible drive mechanism operable to lock the associated pinion when said drive means is not energized, and means for handling articles secured to said wrist member.

8. Article handling apparatus comprising a pivoted arm, a first support slidable on said arm, a nut mounted on said support for rotation only with respect thereto, a rotary support mounted on said nut for rotation only about this axis of said nut, a wrist member pivoted to said rotary support for angular movement about an axis perpendicular to the axis of said nut, gearing for actuating said wrist member including a first gear fixed to said wrist member concentric with its pivot axis, said gearing also including a second gear rotatably supported on said rotary support in mesh with said first gear, a third gear coaxial with respect to and rigidly secured to said second gear for rotation therewith, a circular rack in mesh with said third gear having a threaded portion engaged in said nut and key means to prevent turning of said rack relative to said first support, drive gears fixedly secured to said nut and to said rotary support, pinions carried by said first support in mesh with said drive gears, drive means connected to said pinions for selectively rotating said pinions and finger members adapted to handle articles pivotally secured to said wrist member.

9. Article handling apparatus comprising a pivoted arm, a first support slidable on said arm, a nut mounted on said support for rotation only with respect thereto, a rotary support mounted on said nut for rotation only about the axis of said nut, a wrist member pivoted to said rotary support for angular movement about an axis perpendicular to the axis of said nut, gearing for actuating said wrist member including a first gear fixed to said wrist member concentric with its pivot axis, said gearing also including a second gear rotatably supported on said rotary support in mesh with said first gear, a third gear coaxial with respect to and rigidly secured to said second gear for rotation therewith, a circular rack in mesh with said third gear having a threaded portion engaged in said nut and key means to prevent turning of said rack relative to said first support, drive gears fixedly secured to said nut and to said rotary support, pinions carried by said first support in mesh with said drive gears, drive means connected to said pinions for selectively rotating said pinions, said drive means comprising hydraulic motors on said arm, and telescopically collapsible drive shafts connecting said motors and said pinions and means for handling articles secured to said wrist member.

References Cited in the file of this patent

UNITED STATES PATENTS

| | | | |
|---|---|---|---|
| 484,870 | Babbitt | Oct. 25, | 1892 |
| 807,118 | Kelly | Dec. 12, | 1905 |
| 1,185,427 | Moore | May 30, | 1916 |
| 2,072,747 | Freese | Mar. 2, | 1937 |
| 2,259,636 | Harrington | Oct. 21, | 1941 |
| 2,436,406 | Snader | Feb. 24, | 1948 |
| 2,609,776 | Sahlin | Sept. 9, | 1952 |
| 2,678,521 | Flohr | May 18, | 1954 |
| 2,679,940 | Goertz | June 1, | 1954 |
| 2,695,715 | Goertz | Nov. 30, | 1954 |
| 2,822,094 | Greer | Feb. 4, | 1958 |
| 2,861,701 | Bergsland | Nov. 25, | 1958 |